United States Patent
Leslie et al.

(10) Patent No.: US 11,926,251 B2
(45) Date of Patent: Mar. 12, 2024

(54) UNMANNED VEHICLE CARRYING AND DEPLOYMENT

(71) Applicant: Teledyne FLIR Defense, Inc., Stillwater, OK (US)

(72) Inventors: Elliott Forrest Leslie, Cambridge, MA (US); Annan Michael Mozeika, Groton, MA (US); Daniel Tully, Tyngsboro, MA (US); Jordan Daniel Jesiolowski, Methuen, MA (US)

(73) Assignee: Teledyne FLIR Defense, Inc., Stillwater, OK (US)

( * ) Notice: Subject to any disclaimer, the term of this patent is extended or adjusted under 35 U.S.C. 154(b) by 789 days.

(21) Appl. No.: 16/945,226

(22) Filed: Jul. 31, 2020

(65) Prior Publication Data

US 2021/0031667 A1 Feb. 4, 2021

Related U.S. Application Data

(60) Provisional application No. 62/881,713, filed on Aug. 1, 2019.

(51) Int. Cl.
*B60P 3/06* (2006.01)
*B60P 3/11* (2006.01)
*B64C 39/02* (2023.01)
*B64U 80/86* (2023.01)

(52) U.S. Cl.
CPC ............... *B60P 3/062* (2013.01); *B60P 3/11* (2013.01); *B64C 39/024* (2013.01); *B64U 80/86* (2023.01)

(58) Field of Classification Search
CPC .......... B60P 3/062; B60P 3/11; B64C 39/024; B64U 80/86; B64U 2101/00; B64D 9/00
See application file for complete search history.

(56) References Cited

U.S. PATENT DOCUMENTS

| | | | | |
|---|---|---|---|---|
| 9,050,888 B2 * | 6/2015 | Gettings | ................ | B62D 55/06 |
| 10,706,382 B2 * | 7/2020 | Gil | ............................ | B64D 9/00 |
| 2013/0338825 A1 * | 12/2013 | Cantor | ...................... | B60P 1/00 414/539 |
| 2021/0224739 A1 * | 7/2021 | Sweeny | ............. | G06Q 10/0838 |

* cited by examiner

*Primary Examiner* — Anne Marie Antonucci
*Assistant Examiner* — Lidia Kwiatkowska
(74) *Attorney, Agent, or Firm* — Haynes and Boone, LLP

(57) ABSTRACT

This specification describes systems for unmanned vehicle carrying and deployment. In some examples, a system includes a deployable robot including at least one rotatable flipper disposed on a surface of the deployable robot. The system includes a base unmanned vehicle configured for carrying and deploying the deployable robot. The base unmanned vehicle includes a base robot chassis, and the base robot chassis includes a platform for securing the deployable robot and at least one retention bracket disposed on the platform. The flipper is configured to rotate in a first rotational direction to lock the deployable robot onto the base robot chassis by engaging with the retention bracket.

20 Claims, 12 Drawing Sheets

Figure 1:
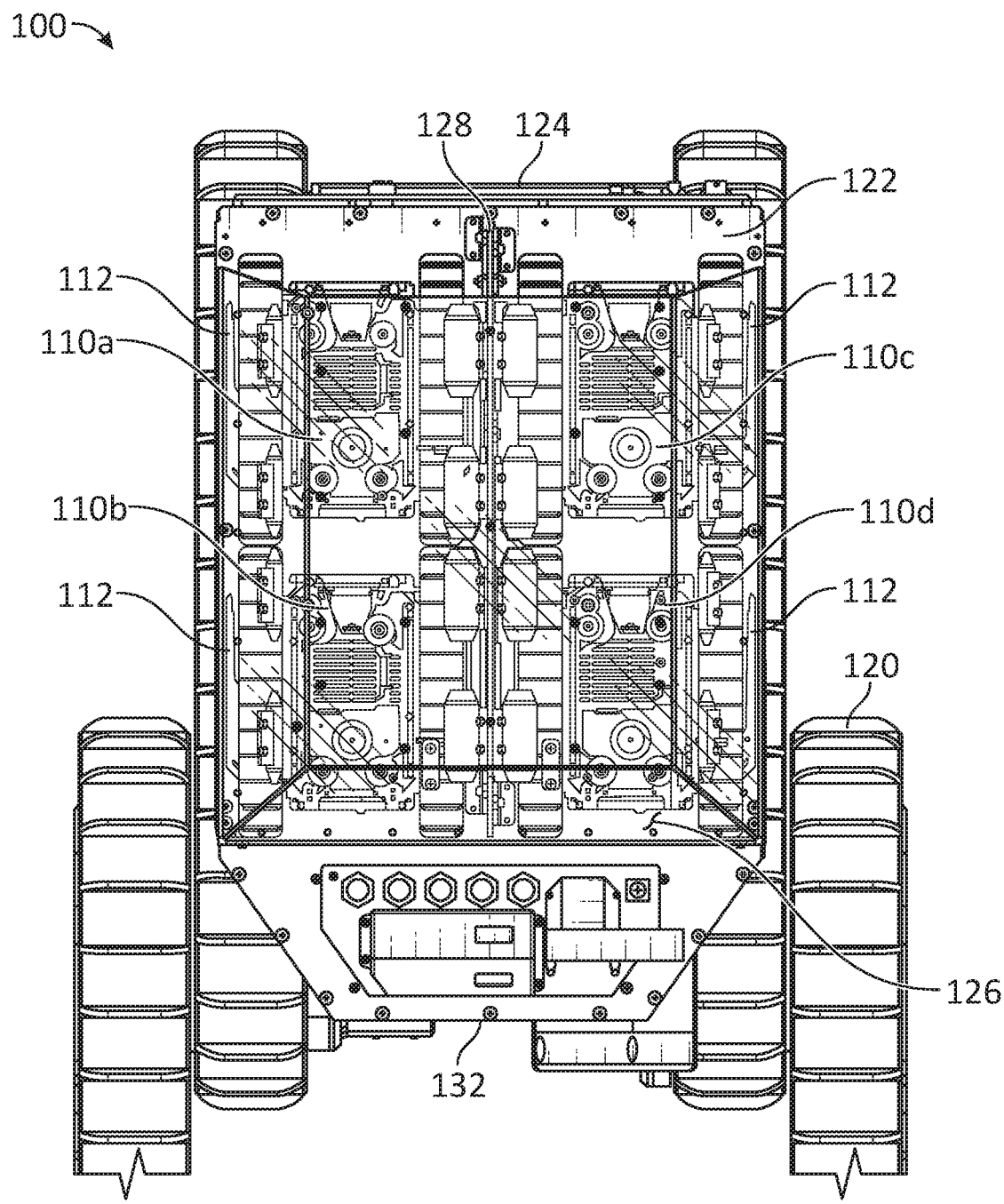

UNMANNED VEHICLE CARRYING AND DEPLOYMENT

CROSS-REFERENCE TO RELATED APPLICATIONS

This application claims the benefit of and priority to U.S. Provisional Patent Application No. 62/881,713 filed Aug. 1, 2019 and entitled "UNMANNED VEHICLE CARRYING AND DEPLOYMENT," which is incorporated herein by reference in its entirety.

STATEMENT OF GOVERNMENT INTEREST

This invention was made with government support under Contract No. HR0011-18-C-0113 awarded by DARPA. The government has certain rights in the invention.

BACKGROUND

Robots are useful in a variety of civilian, military, and law enforcement applications. For instance, an autonomous vehicle can be used to inspect or search buildings under hazardous or hostile conditions. Dangerous situations can be improved by providing detailed information about the location, activities, and capabilities of opponents. Military applications can include reconnaissance, surveillance, bomb disposal and security patrols.

SUMMARY

This specification describes systems for unmanned vehicle carrying and deployment. In some examples, a system includes a deployable robot including at least one rotatable flipper disposed on a surface of the deployable robot. The system includes a base unmanned vehicle configured for carrying and deploying the deployable robot. The base unmanned vehicle includes a base robot chassis, and the base robot chassis includes a platform for securing the deployable robot and at least one retention bracket disposed on the platform. The flipper is configured to rotate in a first rotational direction to lock the deployable robot onto the base robot chassis by engaging with the retention bracket.

The control systems described in this specification may be implemented in hardware, software, firmware, or combinations of hardware, software and/or firmware. In some examples, the control systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

BRIEF DESCRIPTION OF THE DRAWINGS

FIG. 1 illustrates an example robotic vehicle system;

FIG. 2A is a side view of the robotic vehicle system;

FIGS. 2B-2C depict a cross-sectional view of an enclosure and two positions of flippers;

FIGS. 3A-3B illustrate views of a robot inside an enclosure;

FIG. 4 is a view of the interior of an enclosure;

FIGS. 5A-5C are views depicting of the interior of an enclosure seen from a rearward end;

FIG. 6 is a view of a base robot chassis seen from rearward end;

FIG. 7 is a block diagram of a robotic vehicle system;

FIG. 8 is a flow diagram of an example method for carrying deploying an unmanned vehicle; and FIGS. 9A-9B illustrate repositioning unmanned vehicles after deployment.

DESCRIPTION

This specification describes robotic systems and the deployment of robots from base robot vehicles such as unmanned ground vehicles (UGVs) and unmanned aerial vehicles (UAVs). Some applications for unmanned vehicles include a primary robot that performs the essential functions of the application, where the primary robot is large enough to carry sensors, cameras, electronics, etc. for collecting the desired information. These primary robots, or base robot chassis, can be accompanied by smaller robots that ride on the chassis of the primary robot and are deployed to perform secondary functions. For example, the smaller robot can act as a signal node to communicate with a remote operator. The primary robot can then move further away from the operator while still relaying information. In this and other scenarios, the smaller, deployable robot must be retained on the primary robot in such a way that it will not fall off too soon, nor will it be impeded from deployment at the appropriate time. This specification addresses these and other obstacles.

FIG. 1 illustrates an example robotic vehicle system that can be used as an unmanned vehicle capable of conducting operations in various environments such as urban terrain, tunnels, sewers, and caves. Robotic vehicle system 100 can aid in the performance of urban Intelligence, Surveillance, and Reconnaissance (ISR) missions, chemical/Toxic Industrial Chemicals (TIC), Toxic Industrial Materials (TIM), and reconnaissance.

Robotic vehicle system 100 includes a base robot chassis 120 and at least one deployable robot 110. Base robot chassis 120 can include the equipment necessary to perform the primary functions of the operation for which it is designed. These functions can include, for example, autonomously exploring and mapping tunnels or caves and relaying detailed information to a remote operator control unit. Base robot chassis 120 can house a variety of navigational and data-gathering equipment, such as cameras, sensors, communications systems, etc. The example robotic vehicle system 100 depicts a track driven drive system, however other mobility platforms, configurations and morphologies are possible, such as wheel driven platforms, crawling or walking platforms, etc. It is further noted that, although robotic vehicle system 100 is illustrated as a ground vehicle system, base robot chassis 120 can also be configured as an unmanned aerial vehicle (UAV) without departing from the scope of the disclosure.

Robot 110 can perform secondary functions to assist base robot chassis 120 in the operation. For example, robot 110 can be equipped with a relay communications system. This allows base robot chassis 120 an extended range of travel while maintaining contact with the remote operator control unit. In a non-limiting example, base robot chassis 120 can be equipped with a radio system for communicating with a remote unit, as well as sensors that detect and monitor the strength of the radio signal. Before the signal is lost, base robot chassis 120 can instruct a robot 110a to unload from the platform, where it remains behind and acts as a repeater node. Base robot chassis 120 can then continue exploration further into the environment using the relayed signal from deployed robot 110a. As base robot chassis 120 travels away from robot 110 and again detects a weak radio signal, a second robot 110b can be deployed, which relays the radio signal to robot 110a and ultimately to the remote operator unit. This process can be repeated as needed until all robots 110 are deployed from base robot chassis 120.

Still referring to FIG. 1, robots 110 are loaded onto a platform 122 of base robot chassis 120. In the example embodiment shown, robotic vehicle system 100 includes four robots 110 in a 2×2 grid array, and base robot chassis 120 is configured such that the robots are deployed off of a rearward end 124 of base robot chassis 120 relative to a direction of travel. Base robot chassis 120 can further include an enclosure 126 (shown transparently) that covers robots 110 and a longitudinal wall 128 that separates laterally adjacent robots 110.

In order to prevent robots 110 from prematurely unloading from platform 122, it can be useful to provide a releasable connection between robots 110 and base robot chassis 120. Base robot chassis 120 is therefore provided with at least one retention bracket 130 (seen in FIGS. 2B-2C). Retention bracket 130 is located on or near an upper surface of platform 122, and it is designed to engage with a flipper 112 of robot 110. Retention bracket 130 can be, for example, in the form of an L-shaped bracket, which has a vertical wall extending transversely to a longitudinal axis of base robot chassis 120. Other shapes are also possible, such as pockets or receptacles that receive flipper 112. The mounting portion of retention bracket 130 can be attached to base robot chassis 120 in any suitable way (e.g., screws, bolts, adhesives, rivets, plastic tabs, etc.).

Flipper 112 is rotatably attached to an outer surface of robot 110 and can be used for a variety of functions. The term "flipper" includes both a lever-like exterior arm and an internal actuator, such as an electric motor, to move the arm. When robot 110 is resting on platform 122, flipper 112 is used to retain robot 110 to base robot chassis 120 by rotating flipper 112 downward behind retention bracket 130.

Figure 2A:
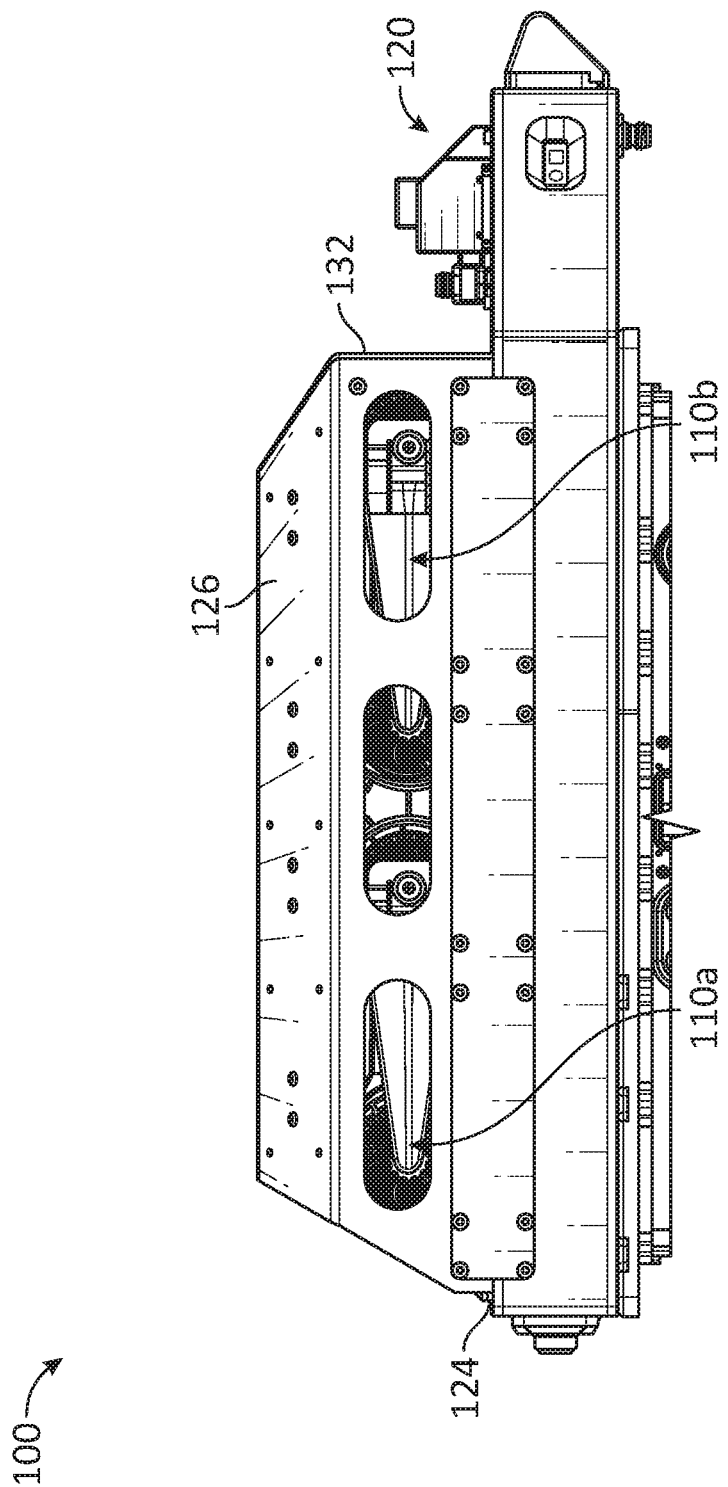

FIG. 2A is a side view of robotic vehicle system 100. In some examples, two robots 110a, 110b are arranged longitudinally inside enclosure 126. A forward end 132 of base robot chassis 120 can include a wall or framework to prevent robots 110 from falling from the front of base robot chassis, while rearward end 124 is open to allow robots 110 to drive off the platform.

Figure 2B:
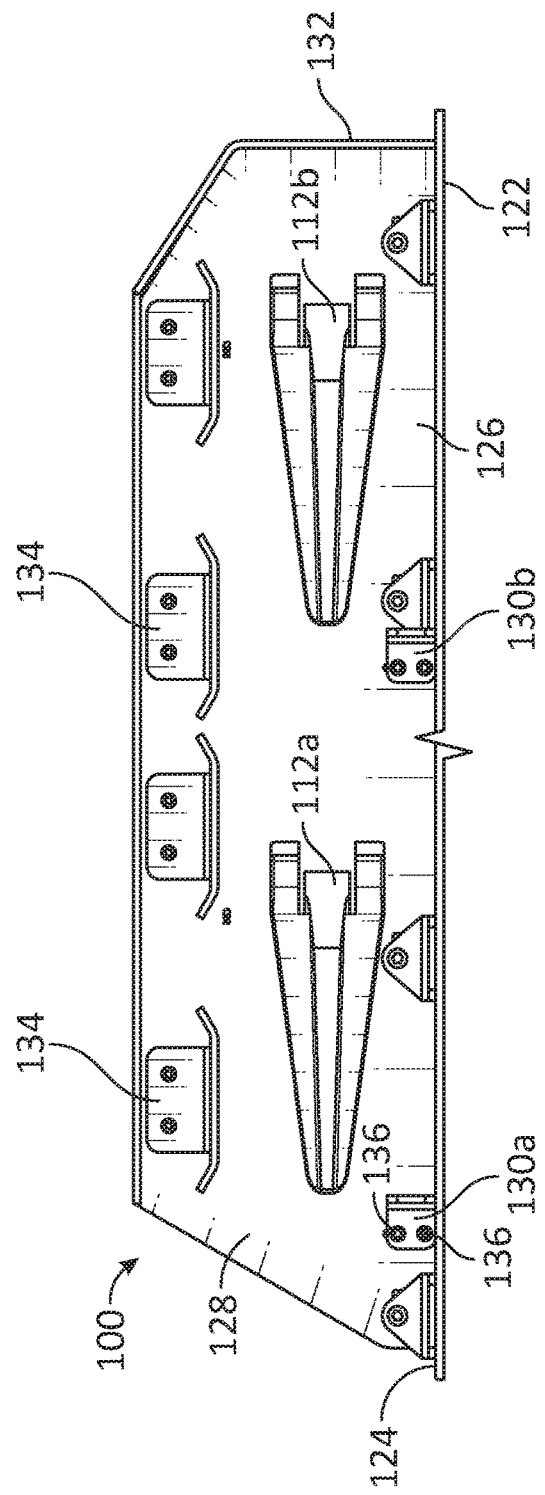
Figure 2C:
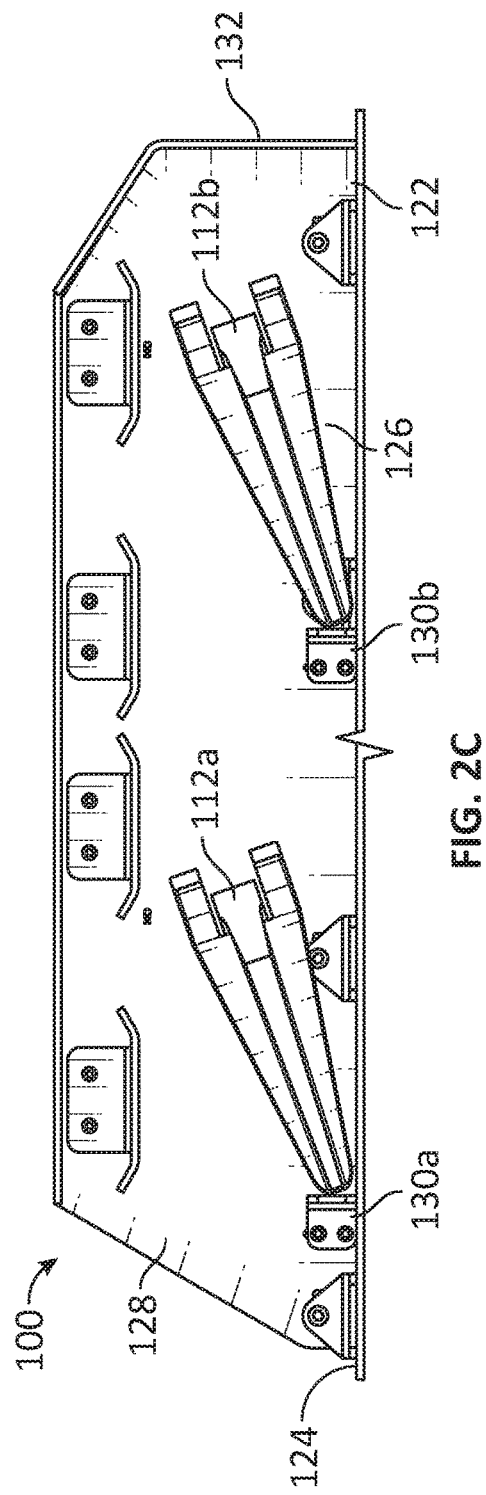

FIGS. 2B-2C depict a cross-sectional view of enclosure 126 and two positions of flippers 112a and 112b. For clarity, the remainder of robots 110a-b are not shown. Retention brackets 130a and 130b are positioned such that robots 110 are contained between retention brackets 130 and forward end 132. In the case of multiple robots 110 as shown in FIGS. 2A-2C, robot 110a can be contained between a rearward retention bracket 130a and a forward robot 110b.

FIG. 2B shows flippers 112a, 112b in an unlocked position. Although flippers 112a, 112b are depicted in a horizontal position, any position that does not engage with retention bracket 130 or interfere with deployment can be used (e.g., ±10° from horizontal, 20° above horizontal, etc.). It is not necessary for flippers 112a and 112b to operate in identical fashion. Each robot 110a, 110b can actuate flipper 112a, 112b individually to the degree necessary for locking and unlocking each particular robot. In the embodiment of FIG. 2, retention brackets 130a, 130b are mounted to longitudinal wall 128 of enclosure 126 using fasteners 136, and retention brackets 130a, 130b are substantially perpendicular to platform 122. Other configurations are also possible, such as mounting retention brackets 130 to platform 122 or to longitudinal wall 128. Enclosure 126 can optionally include additional retention elements 134, for example to secure robots 110 in an orthogonal direction.

FIG. 2C shows flippers 112a, 112b rotated into a locked or captured position behind retention brackets 130a, 130b. In this manner robots 110a, 110b are captured onto platform 122 and prevented from rolling off rearward end 124 prematurely. The height of retention brackets 130 can be adjusted to meet the parameters of the operation. Robot 110 is loaded onto the platform such that flipper 112 can rotate freely behind retention bracket 130 down to the surface of platform 122. It is not necessary for flipper 112 to be in continuous contact with retention bracket 130 prior to deployment.

In some embodiments, robots 110 can be equipped with multiple flippers 112 on different outer surfaces, and each flipper 112 can be rotated individually by varying amounts as needed to securely retain robot 110 on platform 122. In further embodiments, platform 122 can be disposed in orientations other than horizontal. For example, platform 122 can be oriented at an inclined angle or even in a vertical orientation. In these cases, retention bracket 130 can be oriented at an angle suitable for retaining robots 110 (e.g., perpendicular to platform 122 or at an oblique angle to platform 122). Flipper 112 is rotated in a first rotational direction to lock robot 110 onto base robot chassis 120 and a second rotational direction to unlock robot 110 from base robot chassis 120.

Figure 3A:
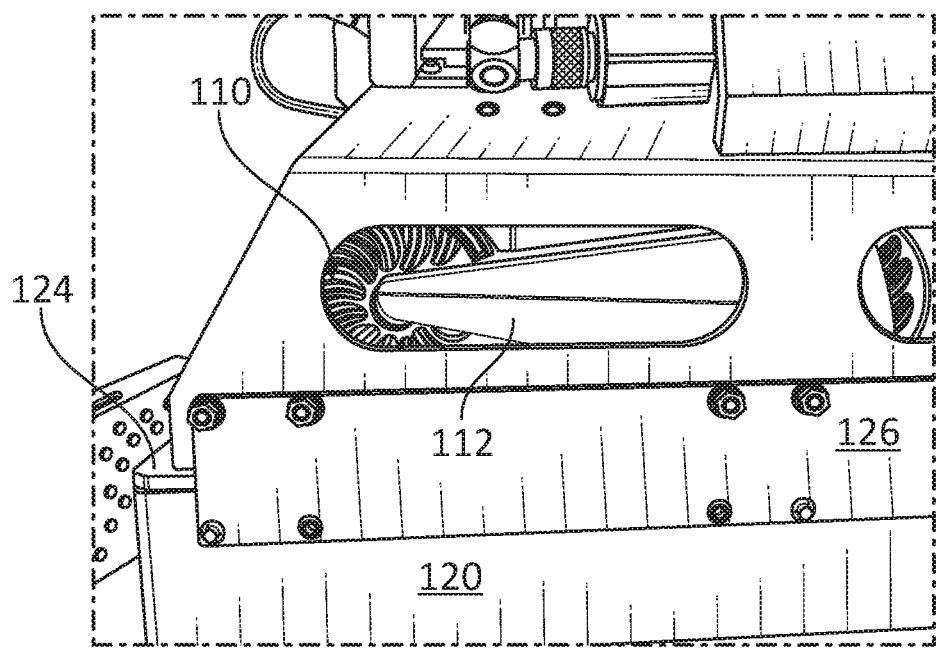
Figure 3B:
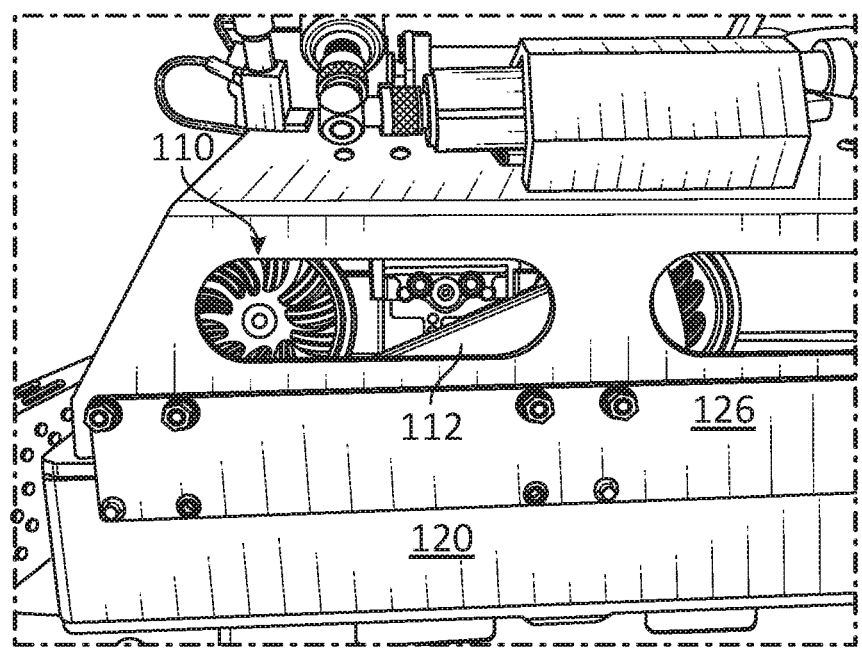

FIGS. 3A-3B illustrate views of a robot 110 inside enclosure 126. FIG. 3A shows flipper 112 in an unlocked position, and FIG. 3B shows flipper 112 in a locked position.

Figure 4:
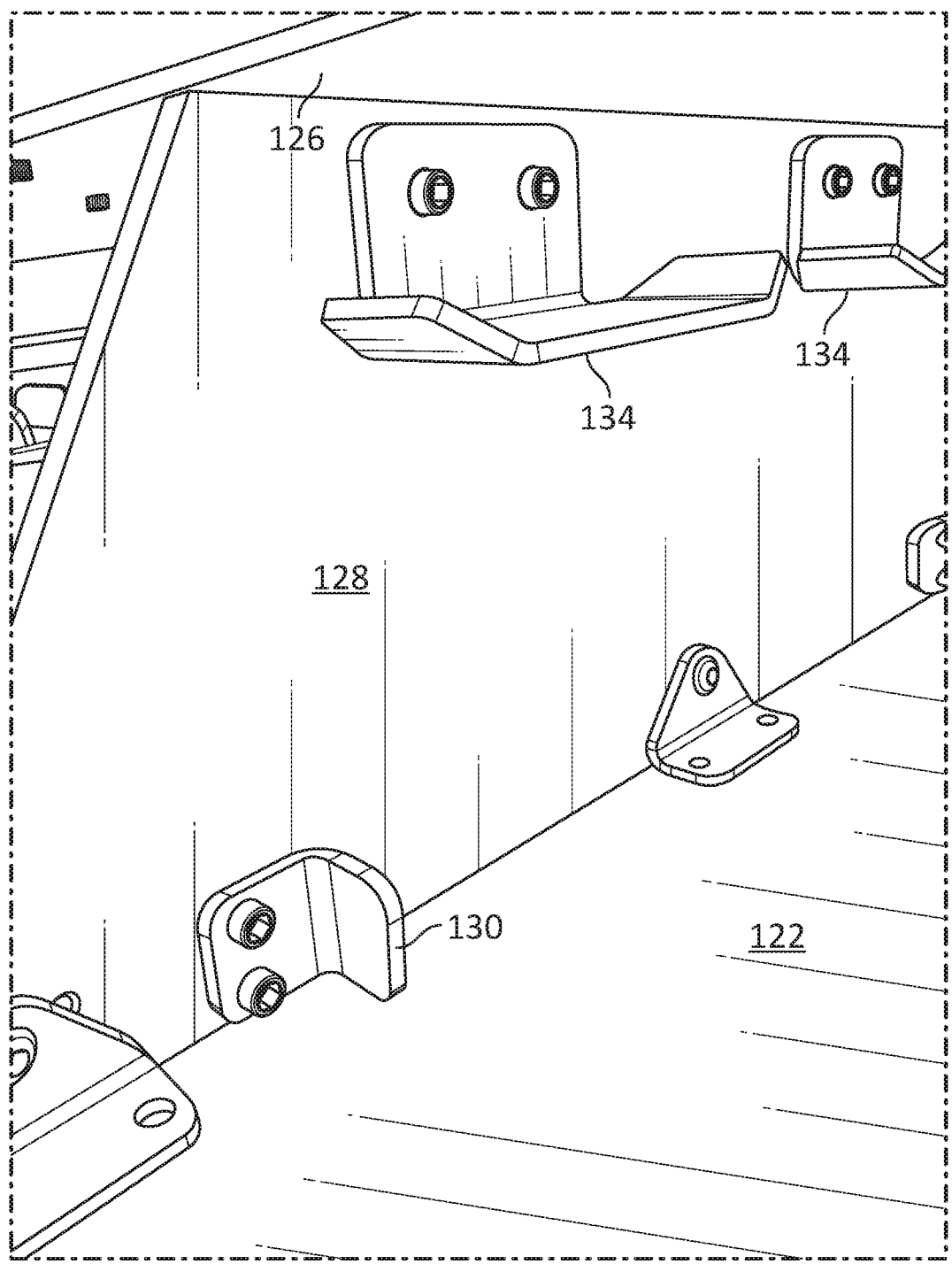

FIG. 4 is a view of the interior of enclosure 126, showing longitudinal wall 128. A retention bracket 130 is mounted to longitudinal wall 128 such that it is just above or substantially in contact with platform 122. Longitudinal wall 128 also includes optional additional retention elements 134.

Figure 5A:
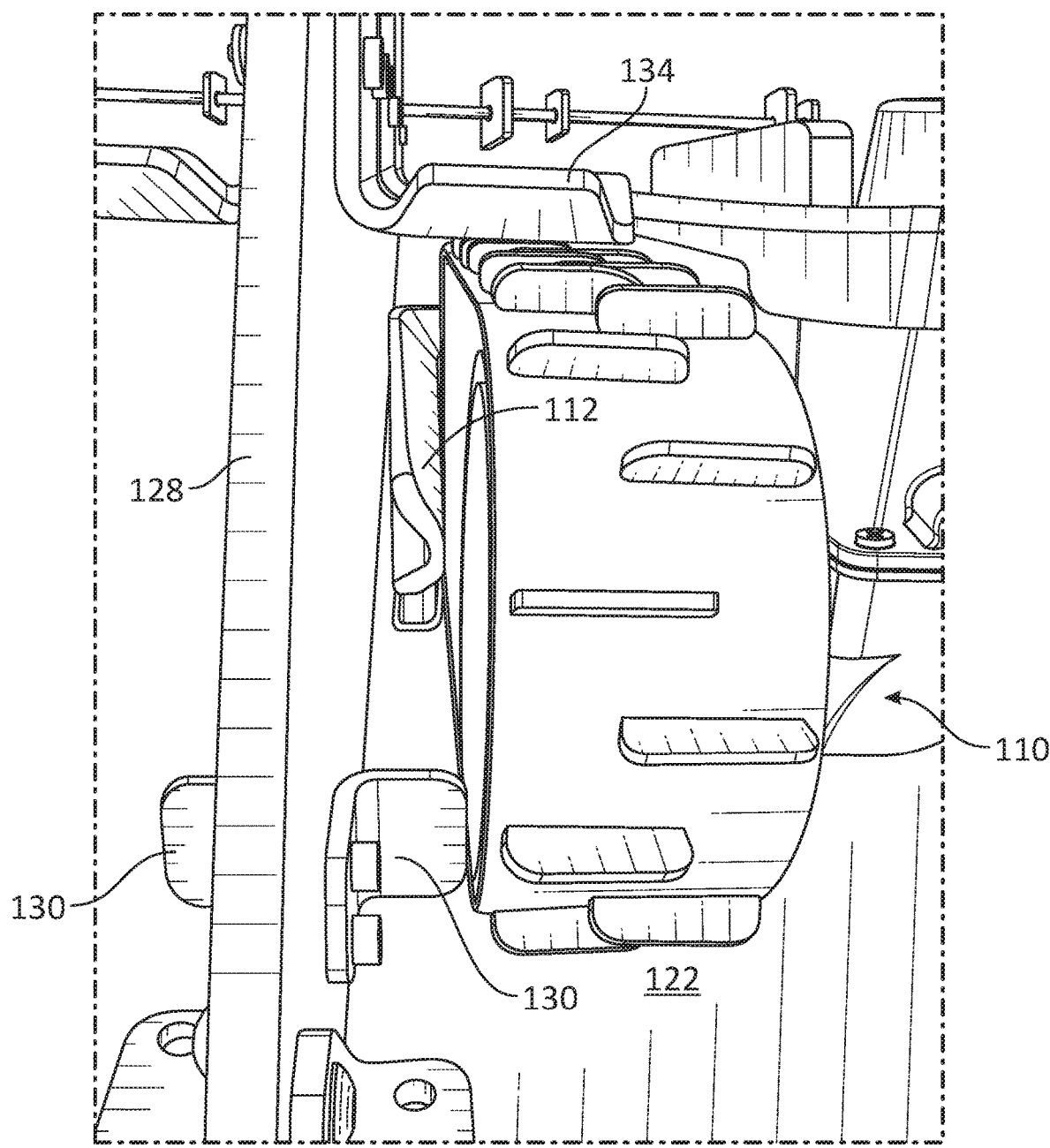
Figure 5B:
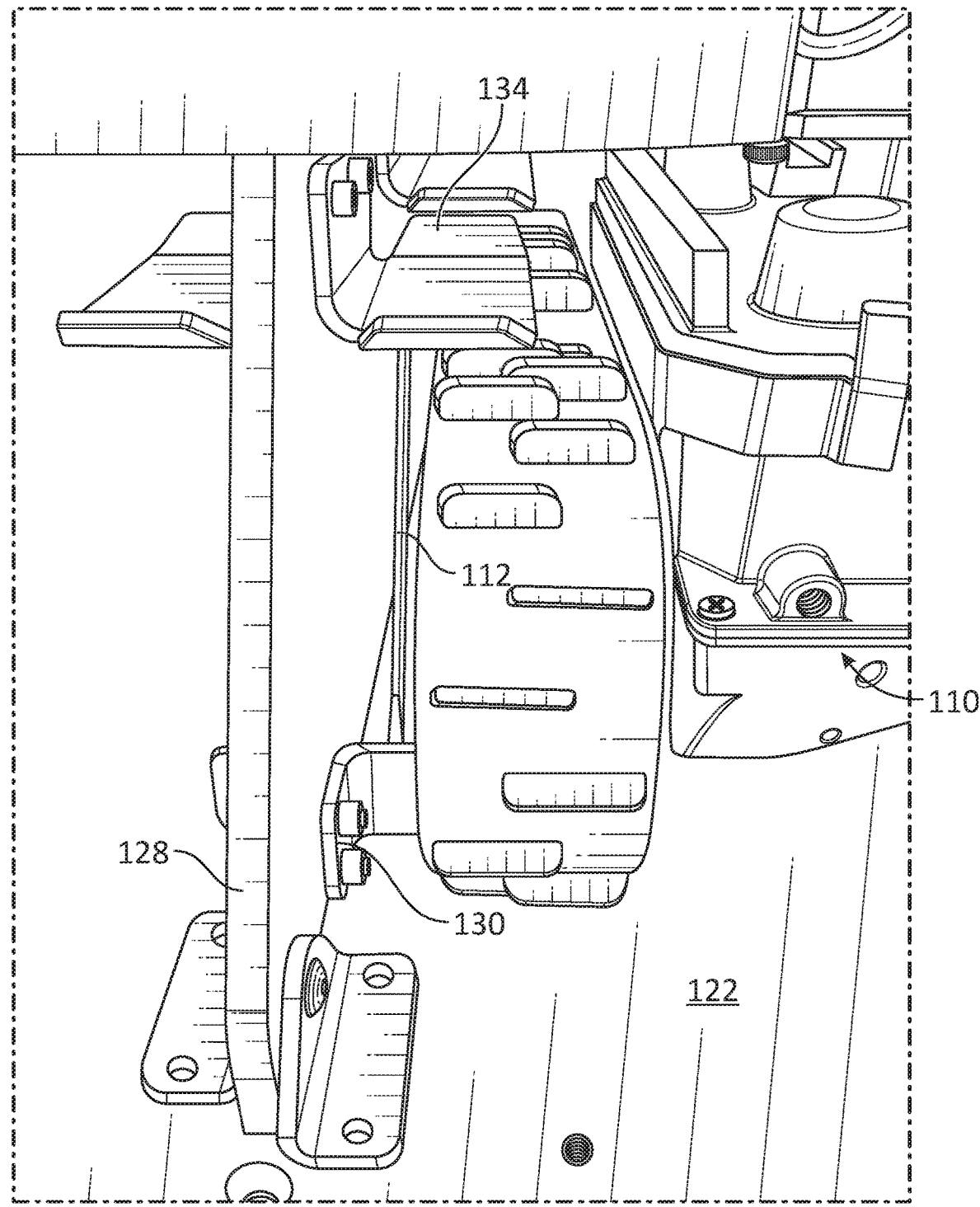
Figure 5C:
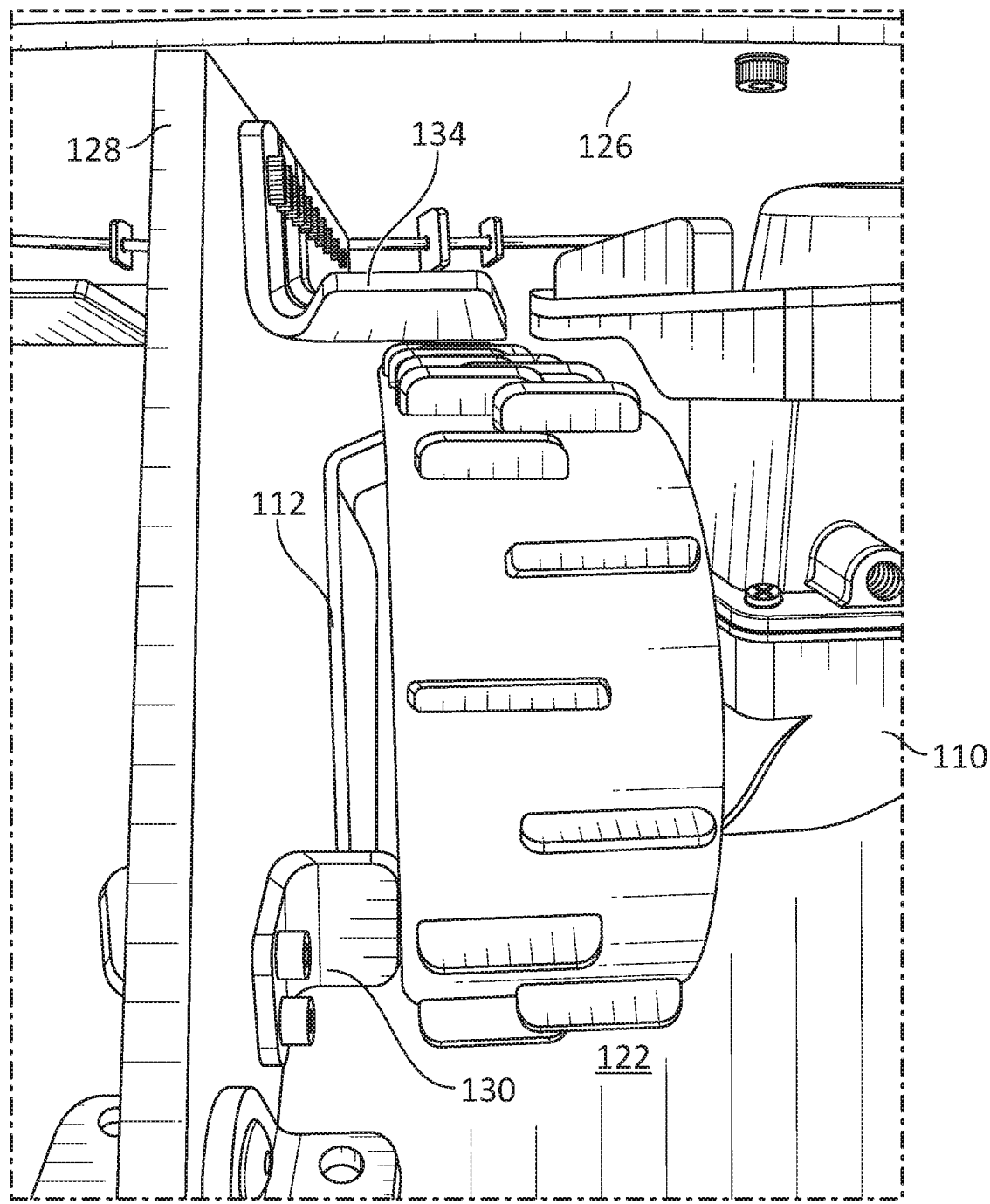

FIGS. 5A-5C are views depicting of the interior of enclosure 126 seen from rearward end 124. In some examples, longitudinal wall 128 divides platform 122 such that two or more robots can be loaded laterally next to one another. A retention bracket 130 is mounted on either side of longitudinal wall 128. In FIG. 5A, a robot 110 is in a right-side bay with respect to the direction of travel, and flipper 112 is in the unlocked position. FIGS. 5B-5C show flipper 112 in the locked position behind retention bracket 130.

Figure 6:
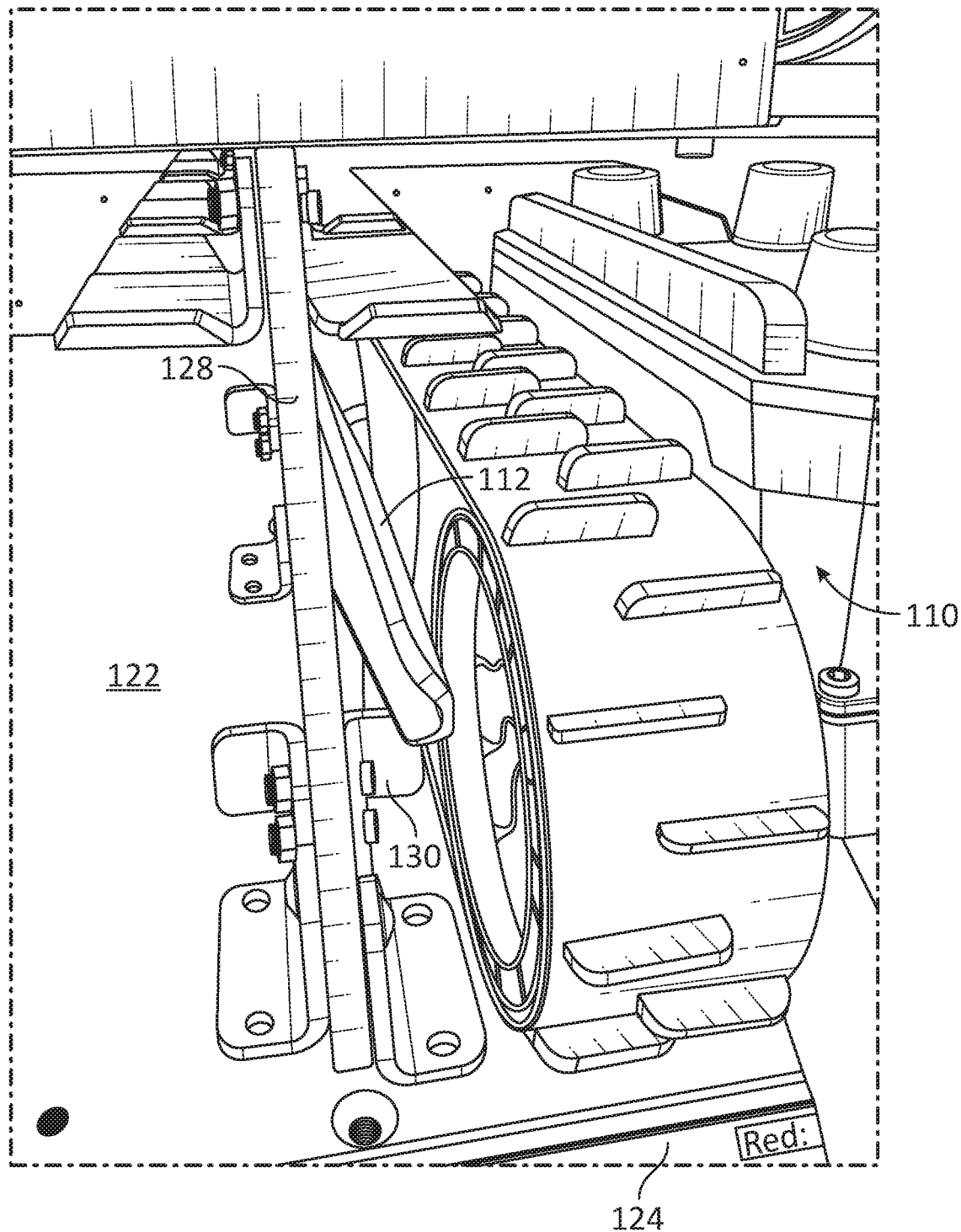

FIG. 6 is also a view of base robot chassis 110 seen from rearward end 124, where robot 110 is partially deployed. Flipper 112 is in a raised position so that it passes over retention bracket 130. Robot 110 can therefore drive off rearward end 124 and begin performing its function for the operation.

Figure 7:
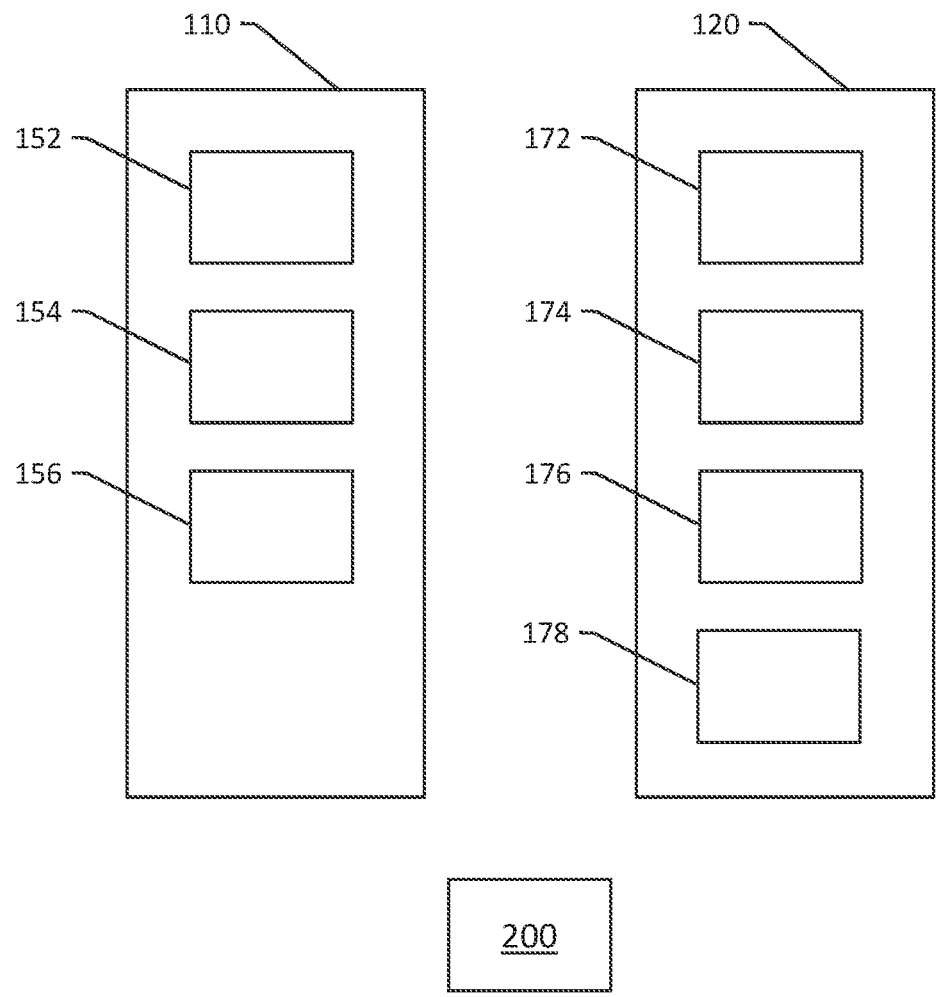
Figure 8:
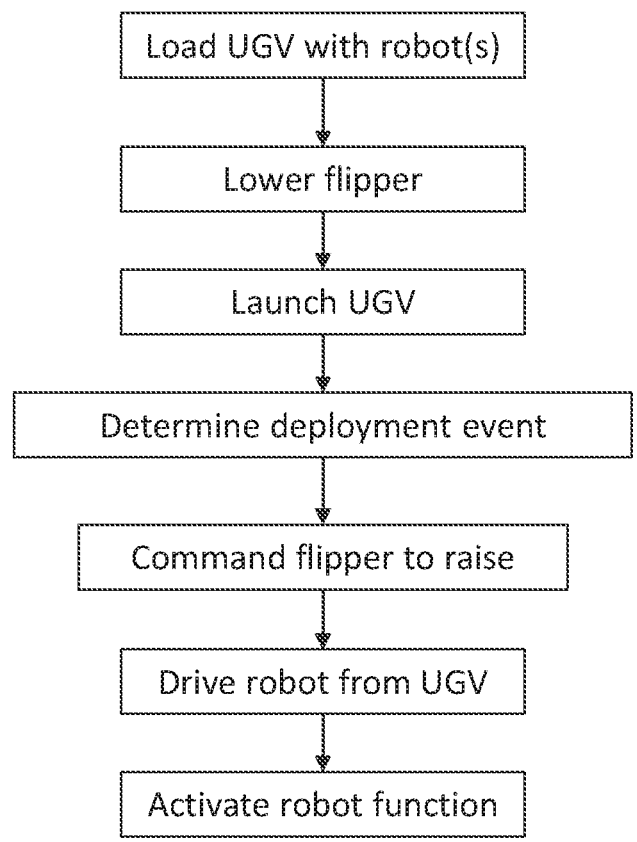

In some examples, robotic vehicle system 100 can be used as an unmanned subterranean exploration system, illustrated schematically in FIG. 7. A corresponding example method of deploying a robotic vehicle is illustrated in FIG. 8.

Base robot chassis 120 can be configured as an unmanned ground vehicle (UGV) having a base controller 172, a communications system 174, and a drive system 176. The UGV can be used to autonomously explore and map tunnels, while looking for artifacts and reporting relevant data to an operator at a remote station 200 outside of the tunnel. This allows operators to understand what is in an underground environment without exposing themselves to potential dangers inside. UGV 120 is used as the primary platform with the mobility necessary to navigate tunnels, and UGV 120 also carries the equipment needed to collect the exploration data. This can include GPS, cameras, electronics, etc. generally described as sensors 178. Robot 110 comprises a deployable controller 152, a deployable communications system 154, and a drive system 156. Base controller 172 and deployable controller 152 may include one or more computer processors and associated memory systems.

UGV 120 is initially loaded with up to, e.g., four robots 110. Enclosure 126 is an aluminum structure divided into two compartments by longitudinal wall 128 located substantially along a central axis, as illustrated in FIG. 1. Each compartment is sized to hold two robots 110. The robots are manually placed on platform 122, and then flippers 112 are rotated down behind a bracket 130. Enclosure 126 only allows robots 110 to exit in the rearward direction, and therefore each robot's flippers 112 will hold the robots inside and prevent them from sliding or rolling out while UGV 120 is exploring a tunnel.

UGV 120 is then launched. In order to relay information to the remote operator, communication signals are relayed from UGV 120 to the remote station 200. In an underground environment with small spaces, rock walls, and twists and turns, the signal strength may drop quickly, and therefore UGV 120 or remote station 200 determines a point at which the signal is too weak to transmit data, which can trigger a deployment event. Before radio signal is lost, one of the rearmost robots (e.g., robot 110a) is deployed from UGV 120.

The command for deployment can be issued, for example, from base controller 172 or from remote station 200. Deployable controller 152 receives the command. Deployable controller 152 then signals flippers 112 to rotate upward and release robot 110a from bracket 130. Drive system 176 drives robot 110a off of platform 122. Robot 110a then rights itself and activates communication system 154, become an additional node for communication signal propagation. Robot 110a can remain stationary once deployed. As UGV 120 continues exploration away from robot 110 and the communication signal again weakens, a second deployment event triggers a second robot (e.g., 110c) to deploy in the same manner as robot 110a. Robot 110c then acts as a relay node between UGV 120 and robot 110a. This process continues until all loaded robots are deployed. In this way UGV 120 can move further into the tunnel while still relaying information to remote station 200.

Once the rear robots 110a and/or 110c are deployed, it is possible for the remaining robots (e.g., 110b, 110d) to relocate themselves on platform 122. This can be performed, for example, to maintain a weight balance of the system. In this case, deployable controller 152 commands flipper 112 to rotate upward, and drive system 156 moves the respective robot 110 to a new location on platform 122. Flipper 112 is then rotated downward behind bracket 130 at the new location.

It will be understood by a person of skill in the art that a deployment event is not limited to communication signal weakness, and that other deployment event triggers are possible. For example, UGV 120 sensors 178 may detect an area to be explored that cannot be reached by the main chassis. The smaller robot can be equipped with a subset of the primary mapping equipment and travel to the unreachable area to collect data and relay it to UGV 120.

Figure 9A:
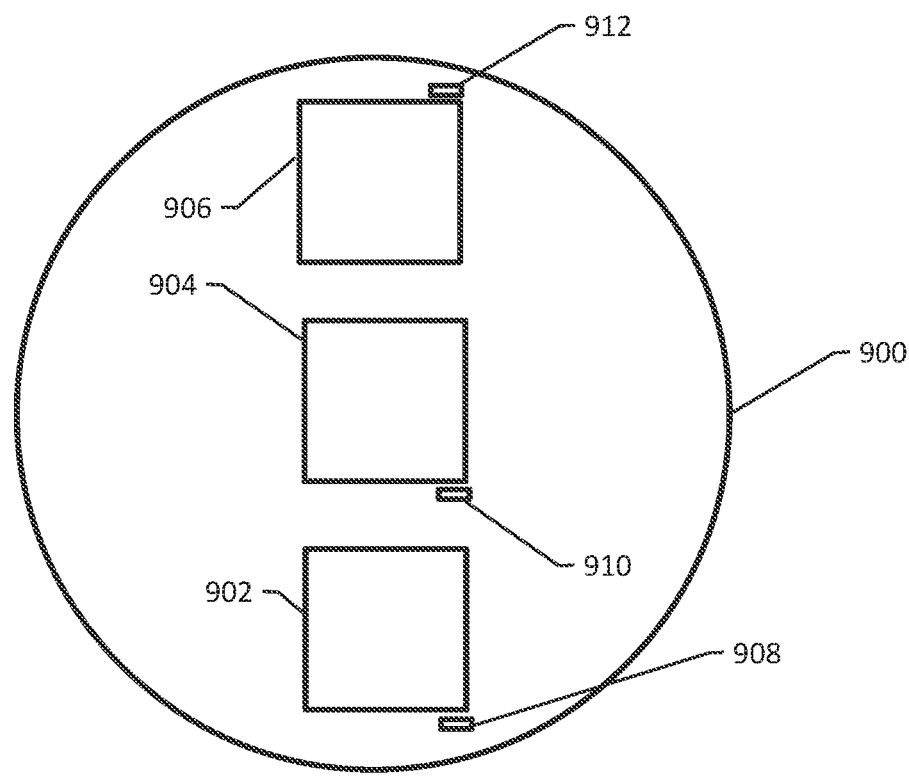
Figure 9B:
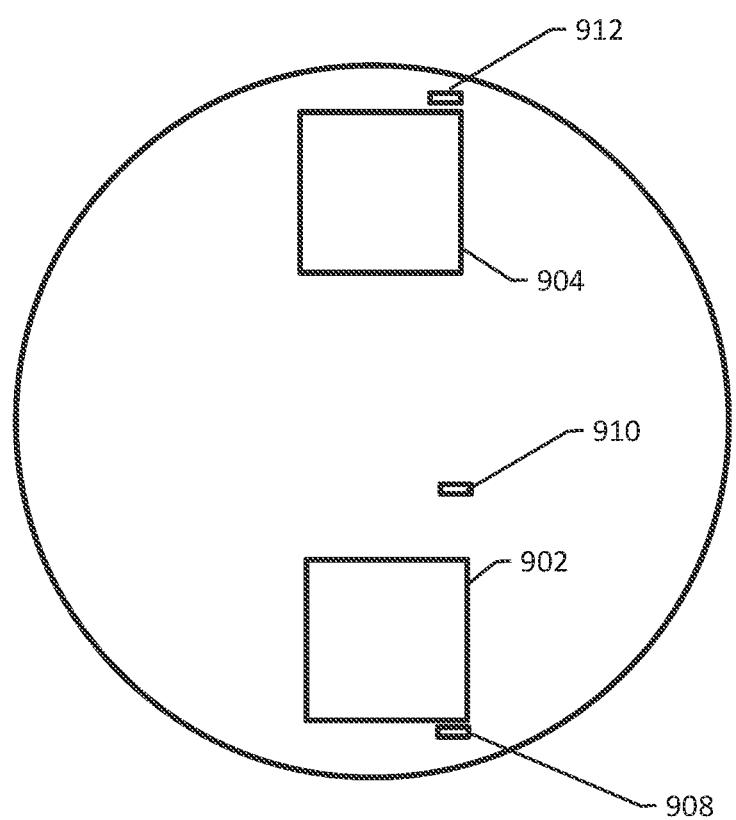

FIGS. 9A-9B illustrate an example of repositioning unmanned vehicles after deployment. FIG. 9A shows a platform 900 of an unmanned aerial vehicle (UAV), e.g., a quadcopter. Three unmanned ground vehicles 902, 904, and 906 are loaded onto platform 900 and are secured by three retention brackets 908, 910, and 912.

Suppose that the UAV determines to deploy unmanned ground vehicle 906, e.g., to cause unmanned ground vehicle to operate as a repeater node in a communications network. The UAV may land and send a command to unmanned ground vehicle 906, causing unmanned ground vehicle 906 to rotate one or more flippers to disengage from retention bracket 912 and to drive off of platform 900. Prior to taking off again, the UAV may send a command to unmanned ground vehicle 904 to drive to a new position to perform weight balancing, e.g., such that a center of gravity of the remaining unmanned ground vehicles is substantially centered within platform 900.

For example, the command can specify coordinates for a location on platform 900, or the command may specify one of a designated number of positions on platform 900 that are pre-programmed onto a control system of unmanned ground vehicle 904. The positions can be pre-programmed to designate the location of retention brackets and/or other features, e.g., spaces within an enclosure or spaces next to ramps for driving off the UAV. Each of the unmanned ground vehicles can be configured to autonomously navigate to the commanded position. For each example, each unmanned ground vehicle can include a skid steer drive system, e.g., a pair of left and right motorized track assemblies, to allow for rotation in place and forward/reverse navigation FIG. 9B shows platform 900 with unmanned ground vehicle 904 in a new position to balance its weight with unmanned ground vehicle 902. Unmanned ground vehicle 904 rotates a flipper to engage with retention bracket 912 at the new position to secure unmanned ground vehicle 904 on platform 900. The UAV may then launch again and communicate with an operator control unit through unmanned ground vehicle 906 acting as a repeater node. By rebalancing the unmanned ground vehicles, the UAV's propulsion and navigation systems can continue to operate within design specifications.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system comprising:
at least one deployable robot, the deployable robot comprising at least one rotatable flipper disposed on a surface of the deployable robot; and
a base unmanned vehicle configured to carry and deploy the deployable robot, the base unmanned vehicle comprising a base robot chassis, the base robot chassis comprising:
a platform to secure the deployable robot; and
at least one retention bracket disposed on the platform, wherein the flipper is configured to rotate in a first rotational direction to lock the deployable robot onto the base robot chassis by engaging with the retention bracket.

2. The system of claim 1, wherein the flipper is further configured to rotate in a second rotational direction to disengage from the retention bracket to allow at least one of the base unmanned vehicle and the deployable robot to separate and travel away from the other one of the base unmanned vehicle and the deployable robot when the flipper is disengaged from the retention bracket.

3. The system of claim 2, wherein the base unmanned vehicle is operable to travel away from the deployable robot.

4. The system of claim 1, wherein the base unmanned vehicle comprises a first control system and the deployable robot comprises a second control system, wherein the first control system is configured to deploy the deployable robot by transmitting a deploy command to the second control system, causing the second control system to control the flipper to rotate in a second rotational direction to disengage from the retention bracket and to drive the deployable robot off of the platform of the base unmanned vehicle.

5. The system of claim 4, wherein the base unmanned vehicle comprises a communication system configured to communicate with an operator control unit, and wherein the deploy the deployable robot comprises receiving an operator command from the operator control unit using the communication system and transmitting the deploy command to the deployable robot in response to receiving the operator command.

6. The system of claim 4, wherein the base unmanned vehicle comprises a communication system configured to communicate with an operator control unit, and wherein the deploy the deployable robot comprises determining, in response to travelling, that a signal strength of the communication system has dropped below a threshold value and, in response, transmitting the deploy command to the deployable robot, causing the deployable robot to operate as a communications repeater node between the operator control unit and the base unmanned vehicle or another deployable robot operating as a communications repeater node.

7. The system of claim 4, wherein the base unmanned vehicle comprises a plurality of sensors, and wherein the first control system of the base unmanned vehicle is configured to execute a mapping routine based on sensor signals from the sensors, and wherein the deploy the deployable robot comprises causing the deployable robot to operate as a communications repeater node to extend a communications range between the base unmanned vehicle and an operator control unit.

8. The system of claim 1, wherein the base unmanned vehicle comprises an unmanned ground vehicle (UGV) comprising one or more motors and right and left driven track assemblies mounted on right and left sides of the base robot chassis.

9. The system of claim 1, wherein the deployable robot comprises an unmanned ground vehicle (UGV) comprising one or more motors and right and left driven track assemblies mounted on right and left sides of the deployable robot, wherein the flipper is disposed on a surface of the deployable robot outside of one of the right and left driven track assemblies.

10. The system of claim 9, wherein the flipper is mounted to a mounting point of the deployable robot that is interior to the one of the right and left driven track assemblies, and wherein a height of the mounting point from the platform is sufficient to provide clearance for the flipper over the retention bracket when the flipper is raised or under the retention bracket when the flipper is lowered.

11. The system of claim 1, wherein the base unmanned vehicle comprises an unmanned aerial vehicle (UAV) carrying a plurality of unmanned ground vehicles on the platform, and wherein the UAV is configured to, in response to deploying one of the unmanned ground vehicles, transmit commands to a plurality of remaining unmanned ground vehicles to drive on the platform to balance a weight of the remaining unmanned ground vehicles on the platform.

12. A method comprising:
launching a base unmanned vehicle carrying a deployable robot, the base unmanned vehicle comprising a base robot chassis, the base robot chassis comprising:
a platform to secure the deployable robot, the deployable robot comprising at least one rotatable flipper disposed on a lateral surface of the deployable robot; and
at least one retention bracket disposed on the platform, wherein the flipper is rotated to lock the deployable robot onto the base robot chassis by engaging with the retention bracket;
wherein the launching comprises:
rotating the flipper to disengage from the retention bracket; and
driving the deployable robot off of the platform of the base unmanned vehicle.

13. The method of claim 12, wherein the base robot chassis comprises a longitudinal wall disposed on the platform for separating laterally adjacent robots, and wherein the retention bracket is mounted to the longitudinal wall.

14. The method of claim 12, wherein the rotating the flipper and driving the deployable robot comprises transmitting a deploy command from a first control system on the base unmanned vehicle to a second control system on the deployable robot.

15. The method of claim 14, wherein the transmitting the deploy command comprises receiving an operator command from an operator control unit using a communication system and transmitting the deploy command to the deployable robot in response to receiving the operator command.

16. The method of claim 14, wherein the transmitting the deploy command comprises determining, at the first control system and in response to travelling, that a signal strength of a communication system has dropped below a threshold value and, in response, transmitting the deploy command to the deployable robot, causing the deployable robot to operate as a communications repeater node between an operator control unit and the base unmanned vehicle or another deployable robot operating as a communications repeater node.

17. The method of claim 14, comprising executing, at the first control system, a mapping routine based on sensor signals from a plurality of sensors of the base unmanned vehicle and causing the deployable robot to operate as a communications repeater node to extend a communications range between the base unmanned vehicle and an operator control unit.

18. The method of claim 12, wherein the base unmanned vehicle comprises an unmanned ground vehicle (UGV) comprising one or more motors and right and left driven track assemblies mounted on right and left sides of the base robot chassis.

19. The method of claim 12, wherein the deployable robot comprises an unmanned ground vehicle (UGV) comprising one or more motors and right and left driven track assemblies mounted on right and left sides of the deployable robot, wherein the flipper is disposed on the lateral surface of the deployable robot outside of one of the right and left driven track assemblies, wherein the flipper is mounted to a mounting point of the deployable robot that is interior to the one of the right and left driven track assemblies, and wherein a height of the mounting point from the platform is sufficient to provide clearance for the flipper over the retention bracket when the flipper is raised or under the retention bracket when the flipper is lowered.

20. The method of claim 12, wherein the base unmanned vehicle comprises an unmanned aerial vehicle (UAV) carrying a plurality of unmanned ground vehicles on the platform, and wherein the method comprises, in response to deploying one of the unmanned ground vehicles, transmitting commands to a plurality of remaining unmanned ground vehicles to drive on the platform to balance a weight of the remaining unmanned ground vehicles on the platform.

\* \* \* \* \*